United States Patent
Park et al.

(10) Patent No.: US 10,690,241 B1
(45) Date of Patent: Jun. 23, 2020

(54) APPARATUS AND METHOD FOR CONTROLLING TRANSMISSION OF VEHICLE AND VEHICLE SYSTEM

(71) Applicants: HYUNDAI MOTOR COMPANY, Seoul (KR); KIA MOTORS CORPORATION, Seoul (KR)

(72) Inventors: Kwang Hee Park, Suwon-si (KR); Byeong Wook Jeon, Seoul (KR); Jae Chang Kook, Hwaseong-si (KR); Sang Jun Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/394,249

(22) Filed: Apr. 25, 2019

(30) Foreign Application Priority Data

Dec. 7, 2018 (KR) .................. 10-2018-0157057

(51) Int. Cl.
| | |
|---|---|
| *F16H 61/02* | (2006.01) |
| *F16H 59/66* | (2006.01) |
| *F16H 59/22* | (2006.01) |
| *F16H 59/18* | (2006.01) |
| *F16H 59/44* | (2006.01) |

(52) U.S. Cl.
CPC .......... *F16H 61/0213* (2013.01); *F16H 59/22* (2013.01); *F16H 59/44* (2013.01); *F16H 2059/186* (2013.01); *F16H 2059/663* (2013.01); *F16H 2059/666* (2013.01); *F16H 2061/0216* (2013.01); *F16H 2061/0237* (2013.01)

(58) Field of Classification Search
CPC .......... F16H 59/22; F16H 59/44; F16H 59/46; F16H 59/66; F16H 2059/666; F16H 2059/186; F16H 2061/0075; F16H 2061/0218; F16H 2061/022; F16H 2061/0223; F16H 2061/0234; F16H 61/0204; F16H 61/0213
See application file for complete search history.

(56) References Cited

U.S. PATENT DOCUMENTS

| | | | |
|---|---|---|---|
| 7,183,942 B2 | 2/2007 | Rock et al. | |
| 8,890,717 B2 * | 11/2014 | McClellan | ............ G08G 1/052 340/936 |
| 10,047,854 B2 | 8/2018 | Kelly et al. | |
| 2016/0076894 A1 * | 3/2016 | Choi | ................ B60W 50/0097 701/461 |
| 2019/0107193 A1 * | 4/2019 | Seimiya | ................ F16H 61/688 |

FOREIGN PATENT DOCUMENTS

KR  10-2011-0033582  3/2011

* cited by examiner

*Primary Examiner* — Edwin A Young
(74) *Attorney, Agent, or Firm* — Brinks Gilson & Lione

(57) ABSTRACT

A transmission control apparatus for a vehicle includes: a speed prediction device that predicts speeds for each gear stage from a current position of the vehicle to a position of a speed camera based on a driving state of the vehicle when it is identified that the speed camera exists on a road ahead while an operation of an accelerator pedal is in an OFF state; and a controller that determines a transmission gear stage based on the predicted speeds for each gear stage and performs a transmission control operation of the vehicle based on the determined transmission gear stage.

21 Claims, 15 Drawing Sheets

US 10,690,241 B1

APPARATUS AND METHOD FOR CONTROLLING TRANSMISSION OF VEHICLE AND VEHICLE SYSTEM

CROSS-REFERENCE TO RELATED APPLICATION

This application claims priority to and the benefit of Korean Patent Application No. 10-2018-0157057, filed on Dec. 7, 2018, the entire contents of which are incorporated herein by reference.

FIELD

The present disclosure relates to an apparatus and a method for controlling a transmission of a vehicle and a vehicle system.

BACKGROUND

The statements in this section merely provide background information related to the present disclosure and may not constitute prior art.

In general, an automatic transmission determines a gear stage based on a shift pattern in which a gear range is previously set based on a relationship between an accelerator pedal opening degree detected by a sensor (e.g., APS: Accelerator Pedal Sensor) and a speed of a vehicle.

However, we have discovered that a transmission control based on a conventional shift pattern does not consider road conditions, such as a road speed limit or a gradient (slope) of a road on which the vehicle is traveling.

For example, when there is a speed camera in front of a vehicle, the vehicle controlled with the conventional shift pattern may be caught on a speed camera while passing through the speed camera at a speed higher than the speed limit.

SUMMARY

An aspect of the present disclosure provides an apparatus and a method for controlling a transmission of a vehicle and a vehicle system, which are capable of improving convenience of a driver by identifying information on a road ahead, such as a position of a speed camera at the front, using information of a navigation and by performing a transmission control operation by taking into account the information on the road ahead and a driving condition before the vehicle reaches a speed detection site of the speed camera.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a transmission control apparatus of a vehicle includes: a speed prediction device that predicts speeds for each gear stage from a current position of the vehicle to a position of a speed camera based on a driving state of the vehicle when it is informed that the speed camera exists on a road ahead of the vehicle while an operation of an accelerator pedal is in an OFF state; and a controller that determines a transmission gear stage based on the predicted speeds for each gear stage and performs a transmission control operation of the vehicle based on the determined transmission gear stage.

The speed prediction device predicts the speeds for each gear stage from the current position of the vehicle to the position of the speed camera based on a speed profile during a coasting driving based on information about the current position and a current speed of the vehicle.

The speed profile includes a first speed profile that defines a speed change for each gear stage depending on a distance change during the coasting driving when a speed of the vehicle is equal to or greater than a reference speed, and a second speed profile that defines a speed change for each gear stage depending on a distance change during the coasting driving when the speed of the vehicle is smaller than the reference speed.

The speed prediction device determines a convergence speed for each gear stage between the first speed profile and the second speed profile and compares the current speed of the vehicle with the convergence speed to select one of the first speed profile and the second speed profile.

The speed prediction device interpolates the determined convergence speed for each gear stage based on a gradient of the road ahead of the vehicle.

The speed prediction device selects the first speed profile when the current speed of the vehicle is equal to or greater than the convergence speed.

The speed prediction device selects the second speed profile when the current speed of the vehicle is smaller than the convergence speed.

The speed prediction device extracts a valid speed profile corresponding to a remaining distance from the current position of the vehicle to the position of the speed camera when one of the first speed profile and the second speed profile is selected and predicts the speeds for each gear stage to the position of the speed camera based on the extracted valid speed profile.

The controller extracts gear stages corresponding to a speed limit range of the speed camera among the predicted speeds for each gear stage and determines a highest gear stage among the extracted gear stages as the transmission gear stage.

The controller determines a lowest speed among the predicted speeds for each gear stage as the transmission gear stage when the predicted speeds for each gear stage exceed a speed limit range of the speed camera.

The controller determines a highest speed among the predicted speeds for each gear stage as the transmission gear stage when the predicted speeds for each gear stage are less than a speed limit range of the speed camera.

The controller determines the transmission gear stage in a maximum transmission range that is previously determined based on a current gear stage of the vehicle.

The controller performs the transmission control operation based on a predefined shift pattern when the vehicle passes the position of the speed camera.

The controller performs the transmission control operation based on a predefined shift pattern when the operation of the accelerator pedal is switched to an ON state from the OFF state.

The transmission control apparatus further includes an information collection device that is configured to collect information on the road ahead from a navigation apparatus.

The information on the road ahead include at least one of the position of the speed camera, a speed limit of the road, and a gradient of the road.

According to another aspect of the present disclosure, a transmission control method of a vehicle includes: predicting, by a speed prediction device, speeds for each gear stage from a current position of the vehicle to a position of a speed camera based on a driving state of the vehicle when it is informed that the speed camera exists on a road ahead of the vehicle while an operation of an accelerator pedal is in an OFF state; and determining, by a contaroller, a transmission gear stage based on the predicted speeds for each gear stage and performing a transmission control operation of the vehicle based on the determined transmission gear stage.

According to another aspect of the present disclosure, a vehicle system includes: a navigation apparatus; and a transmission control apparatus that determines a transmission gear stage based on predicted speeds for each gear stage from a current position of a vehicle to a position of a speed camera according to a driving state of the vehicle when the navigation apparatus identifies a presence of the speed camera on a road ahead of the vehicle. In addition, the transmission control apparatus performs a transmission control operation of the vehicle based on the determined transmission gear stage.

DRAWINGS

In order that the disclosure may be well understood, there will now be described various forms thereof, given by way of example, reference being made to the accompanying drawings, in which:

The above and other objects, features and advantages of the present disclosure will be more apparent from the following detailed description taken in conjunction with the accompanying drawings.

Figure 1:
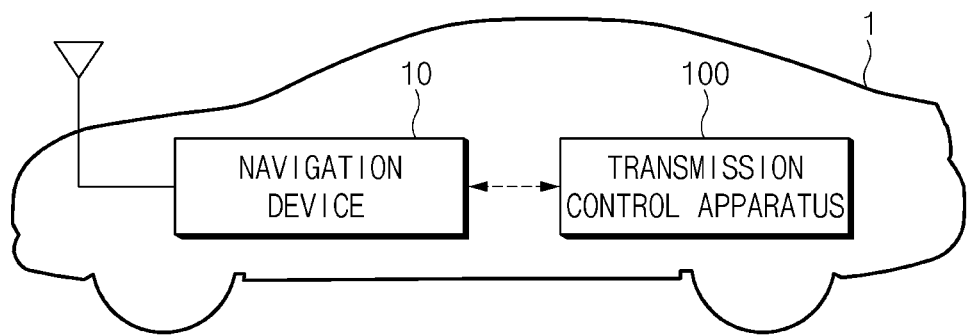
FIG. 1 is a view illustrating a vehicle system to which a transmission control apparatus of a vehicle is applied according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known features or functions will be ruled out in order not to unnecessarily obscure the gist of the present disclosure.

In describing elements of exemplary forms of the present disclosure, the terms 1st, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a vehicle system to which a transmission control apparatus of a vehicle is applied according to an exemplary form of the present disclosure.

Referring to FIG. 1, the vehicle system may include a navigation apparatus 10 and a transmission control apparatus 100.

The navigation apparatus 10 may include a road map. The road map may include details of each road. As an example, the road map may include information about a speed camera mounted beside or over a road and road gradient information. In the present exemplary form, the navigation apparatus 10 may extract road information about a predetermined section of a road ahead from a current position of a vehicle 1 in response to a request from the transmission control apparatus 100 and may provide the extracted road information to the transmission control apparatus 100.

The transmission control apparatus 100 may perform a transmission control operation by taking into account the information on the road ahead of the vehicle and driving condition information about the vehicle 1 before the vehicle 1 reaches a detection section of the speed camera.

In this case, the transmission control apparatus 100 may predict a speed when the vehicle 1 reaches a position of the speed camera based on information about the position of the speed camera, the road gradient information, and vehicle speed information and may determine a transmission gear stage based on the predicted speed.

Detailed configurations and operations of the transmission control apparatus 100 will be described with reference to FIG. 2.

The navigation apparatus 10 and the transmission control apparatus 100 according to the present disclosure may be implemented inside the vehicle 1. In this case, the navigation apparatus 10 and the transmission control apparatus 100 may be operated in conjunction with controllers in the vehicle 1.

Figure 2:
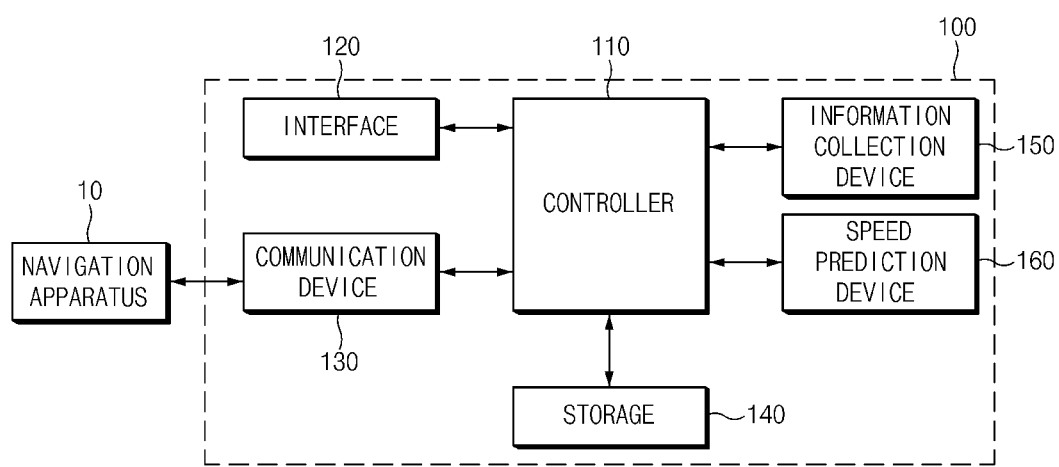
FIG. 2 is a block diagram illustrating a configuration of a transmission control apparatus of a vehicle according to an exemplary form of the present disclosure.

FIG. 2 is a block diagram illustrating a configuration of the transmission control apparatus 100 of the vehicle 1 according to an exemplary form of the present disclosure.

Referring to FIG. 2, the transmission control apparatus 100 may include a controller 110, an interface 120, a communication device 130, a storage 140, an information collection device 150, and a speed prediction device 160. In the present exemplary form, the controller 110, the information collection device 150, and the speed prediction device 160 of the transmission control apparatus 100 may be implemented as at least one processor.

The interface 120 may include an input device to receive a control instruction from a user and an output device to output an operation state and operation results of the transmission control apparatus 100.

Here, the input device may include a key button, a mouse, a joystick, a jog shuttle, a stylus pen, and the like. In addition, the input device may include a soft key implemented on a display.

The output device may include the display and a voice output device, such as a speaker. In a case that a touch sensor, e.g., a touch film, a touch sheet, a touch pad, etc., is included in the display, the display may operate as a touch screen, and the display may be implemented in an integrated form of the input device and the output device.

In this case, the display may include at least one of a liquid crystal display (LCD), a thin film transistor-liquid crystal display (TFT-LCD), an organic light-emitting diode (OLED), a flexible display, a field emission display (FED), or a three-dimensional (3D) display.

The communication device 130 may include a communication module that supports a communication interface with electrical equipments and/or controllers included in the vehicle 1. For example, the communication module may be connected to the navigation apparatus 10 of the vehicle 1 and may receive the information on the road ahead from the navigation apparatus 10. In the present exemplary form, the information on the road ahead may include information about the position of the speed camera, a road speed limit, and/or a gradient. In addition, the communication module may further receive driving information, such as on/off states of operation of an accelerator pedal, a vehicle speed, etc., from a sensor and/or a management device of the vehicle 1.

The communication module may include a module supporting a vehicle network communication, such as a controller area network (CAN) communication, a local interconnect network (LIN) communication, and a Flex-ray communication.

The communication device may further include a communication module for a wireless internet access and/or a communication module for a short range communication. As a wireless internet technology, a wireless LAN (WLAN), a wireless broadband (Wibro), a Wi-Fi, a world interoperability for microwave access (Wimax), and the like may be used, and a Bluetooth, a ZigBee, an ultra wideband (UWB), a radio frequency identification (RFID), an infrared data association (IrDA), and the like may be used as a short range communication technology.

The storage 140 may store data and/or algorithms desired to operate the transmission control apparatus 100. As an example, the storage 140 may store the information on the road ahead and the driving information, which are provided through the communication device. The storage 140 may store predicted speed information for each gear stage at the position of the speed camera. In addition, the storage 140 may store speed profile information according to the driving state, may predict the speed for each gear stage at the position of the speed camera based on the speed profile information, may determine the transmission gear stage based on the predicted speed, and may store a speed profile-based active control logic to perform the transmission control depending on the transmission gear stage.

In the present form, the storage 140 may include a storage medium, such as a random access memory (RAM), a static random access memory (SRAM), a read-only memory (ROM), a programmable read-only memory (PROM), an electrically erasable programmable read-only memory (EEPROM), etc.

The information collection device 150 may collect the information on the road ahead from the navigation apparatus 10 while the vehicle 1 is running. The information collection device 150 may collect information about the position of the speed camera, the road speed limit, and/or the gradient of the road ahead with respect to a current position of the vehicle 1. In this case, the information collection device 150 may collect the information on the road ahead in real time or on a predetermined time basis while the vehicle 1 is running.

In addition, the information collection device 150 may collect the driving information about the vehicle 1, e.g., the on/off states of operation of the accelerator pedal and the vehicle speed.

The information collection device 150 may store the information on the road ahead and/or the driving information about the vehicle, which are collected from the navigation apparatus 10, in the storage 140. In addition, the information collection device 150 may transmit the collected information on the road ahead to the controller 110 and/or the speed prediction device 160.

The controller 110 may identify whether the accelerator pedal is switched to an operation-off state based on the driving information collected by the information collection device 150. When the accelerator pedal is switched to the operation-off state, the controller 110 may determine whether the speed camera exists on the road ahead based on the collected information on the road ahead.

When it is determined that the speed camera exists on the road ahead in the operation-off state of the accelerator pedal, the speed prediction device 160 may predict a speed of the vehicle when the vehicle reaches the position of the speed camera from the current position of the vehicle with respect to a current speed of the vehicle by using the information about the position of the speed camera, the road speed limit, the gradient, and the current speed of the vehicle, which are collected by the information collection device 150.

In this case, the speed prediction device 160 may select one of a high speed type profile and a low speed type profile and may predict the speed for each gear stage when the vehicle 1 reaches the position of the speed camera based on the selected profile.

Detailed descriptions on the operation of predicting the speed for each gear stage when the vehicle 1 reaches the position of the speed camera will be described with reference to FIGS. 3 to 7B.

The controller 110 may determine a gear stage corresponding to a speed that best matches a predetermined condition among the speeds for each gear stage, which are predicted by the speed prediction device 160, as the transmission gear stage. Detailed descriptions on the operation of selecting the speed that best matches the predetermined condition among the speeds for each gear stage and determining the transmission gear stage will be described with reference to FIGS. 8A to 8E.

When the transmission gear stage is determined, the controller 110 performs the transmission control operation based on the determined transmission gear stage at a time when reaching a shift position before reaching the speed camera.

In the present exemplary form, when the accelerator pedal is switched to the operation-off state and the speed camera exists on the road ahead, the controller 110 may activate the speed profile-based active control logic. In this case, the speed prediction device 160 and the controller 110 may perform operations for the transmission control based on the activated speed profile-based active control logic.

Figure 3:
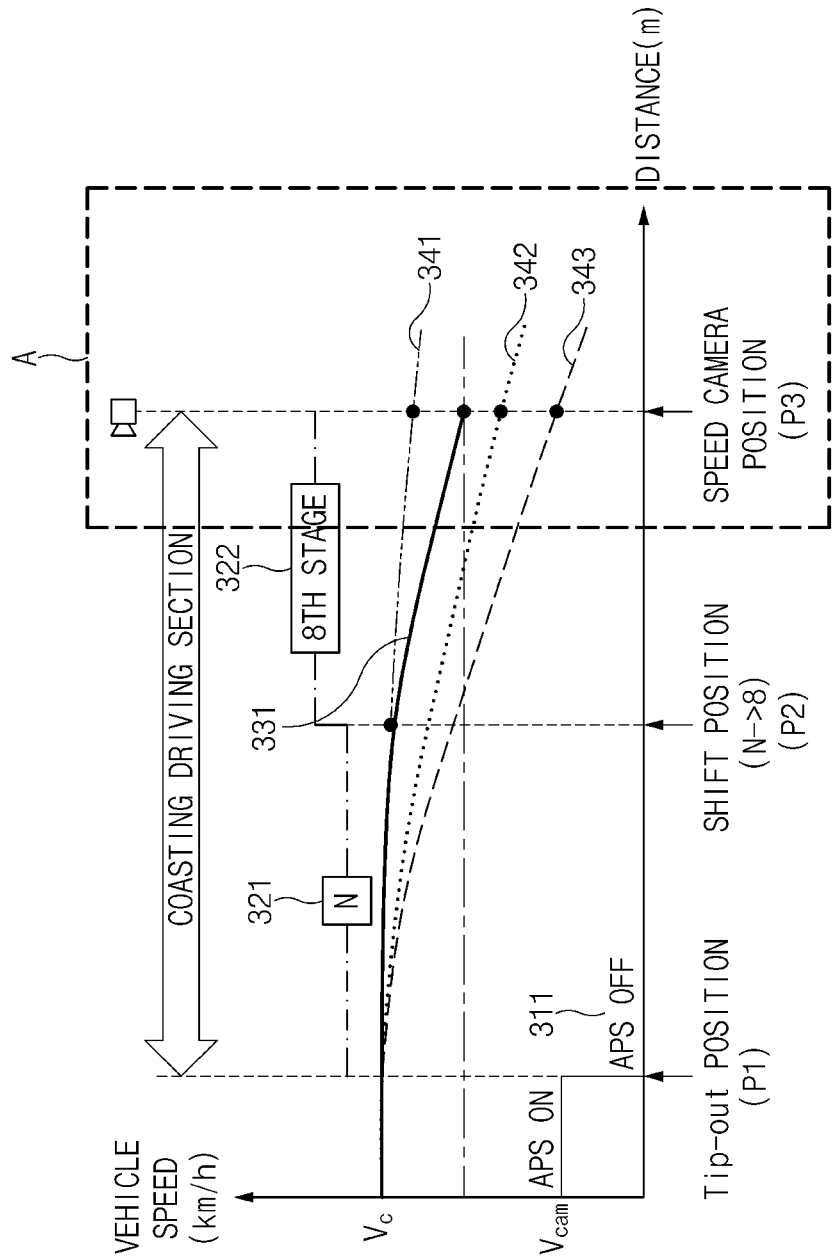
FIG. 3 is a view illustrating a variation in speed of a vehicle as a function of a position of the vehicle according to an exemplary form of the present disclosure.

FIG. 3 is a view illustrating a variation in speed of a vehicle as a function of a position of the vehicle according to an exemplary form of the present disclosure. Referring to FIG. 3, in a case that the operation state of the accelerator pedal is switched to "OFF" at the first position P1 as operation 311 when the vehicle runs while maintaining the current speed Vc, the transmission control apparatus 100 starts a coasting driving from the first position to a third position P3 at which the speed camera is located. In this case, the vehicle may perform a neutral coasting control (NCC) until the vehicle reaches a second position, which is the shift position, as operation 321.

A predicted speed change graph based on the current gear stage until the vehicle reaches the third position with respect to the current speed of the vehicle is the same as represented by a reference numeral 331, and a predicted speed change graph for each gear stage is the same as represented by reference numerals 341 to 343. Accordingly, the transmission control apparatus 100 may determine the transmission gear stage based on the predicted speed at the third position P3.

When the vehicle reaches the second position, the transmission control apparatus 100 may shift the gear stage to the transmission gear stage determined based on the predicted speed at the third position P3 as operation 322.

In detail, the speed prediction device 160 calculates a convergence speed of each speed profile at the third position based on the current speed at the first position using a predefined speed profile.

Figure 4A:
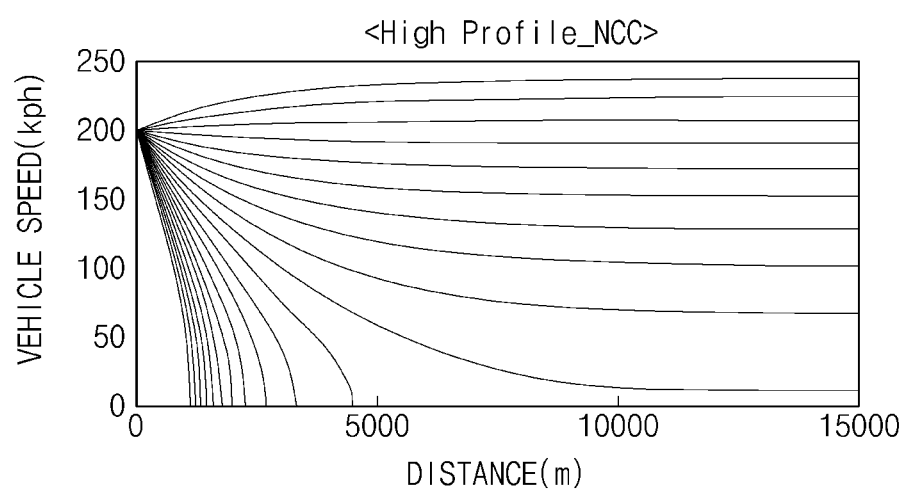
FIGS. 4A and 4B are graphs respectively illustrating vehicle speeds based on high and low speed profiles in a neutral coasting control according to one form of the present disclosure.
Figure 4B:
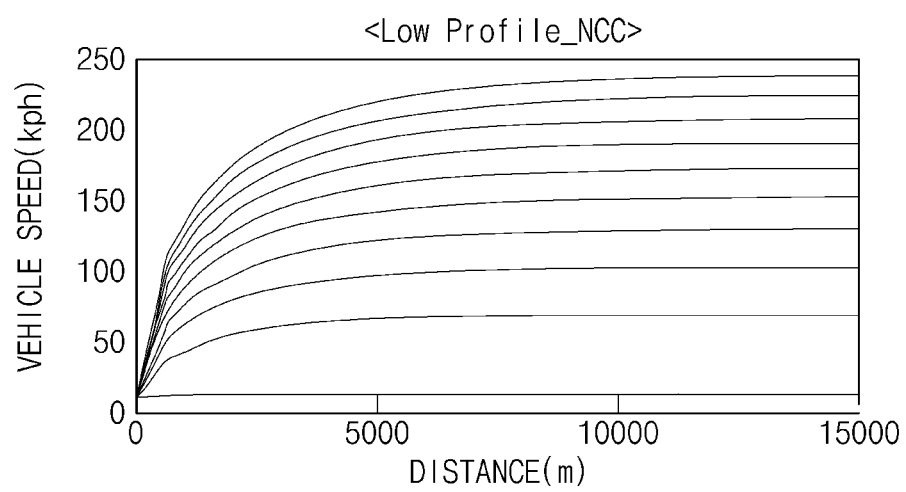
Figure 4C:
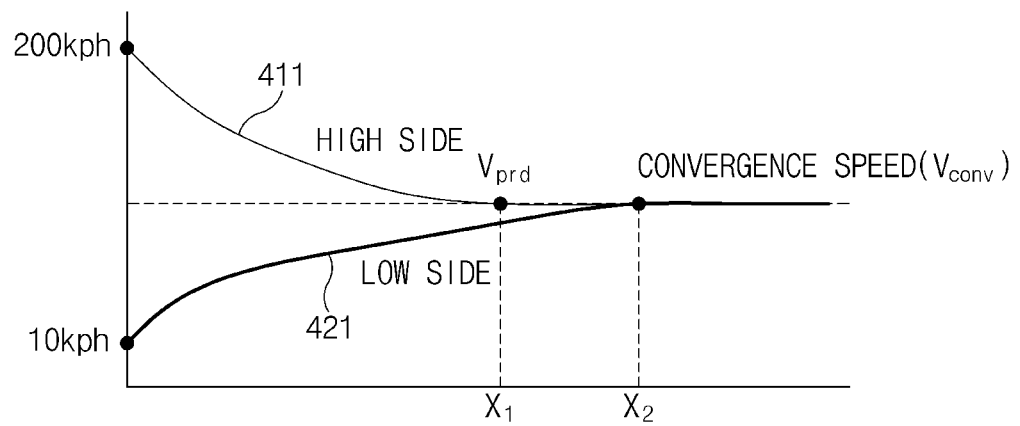
FIG. 4C is a graph illustrating a convergence speed based on speed profiles in one form of the present disclosure.

As an example, FIG. 4A illustrates a speed profile (hereinafter, referred to as a "first speed profile") for each gear stage based on a neutral coasting control at a high-speed state, and FIG. 4B illustrates a speed profile (hereinafter, referred to as a "second speed profile") for each gear stage based on a neutral coasting control at a low-speed state. The speed prediction device 160 may determine a convergence speed Vconv between a high-speed type first speed profile 411 and a low-speed type second speed profile 421 (See, FIG. 4C).

Figure 5:
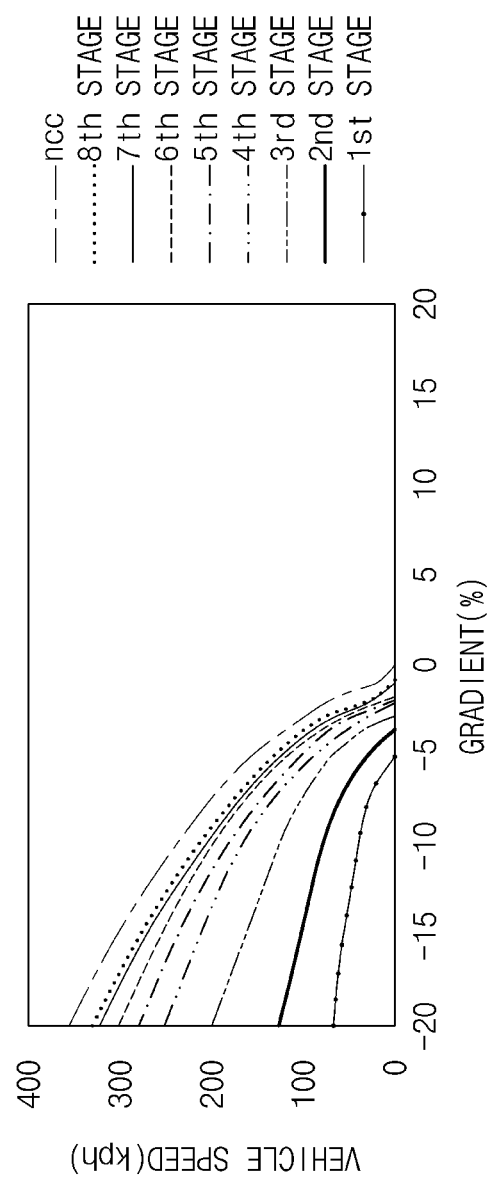
FIG. 5 is a graph illustrating interpolated speeds for each gear stage based on gradient of a road in one form of the present disclosure.

In this case, the speed prediction device 160 may interpolate the convergence speed for each gear stage using the information about the gradient of the road ahead. As illustrated in FIG. 5, the convergence speed for each gear speed is interpolated depending on the gradient of the road.

When the convergence speed for each gear stage is determined, the speed prediction device 160 may compare the current speed of the vehicle with the convergence speed for each gear stage and may select one speed profile for predicting the speed between the high-speed type first speed profile 411 and the low-speed type second speed profile 421 depending on the compared result.

Figure 6A:
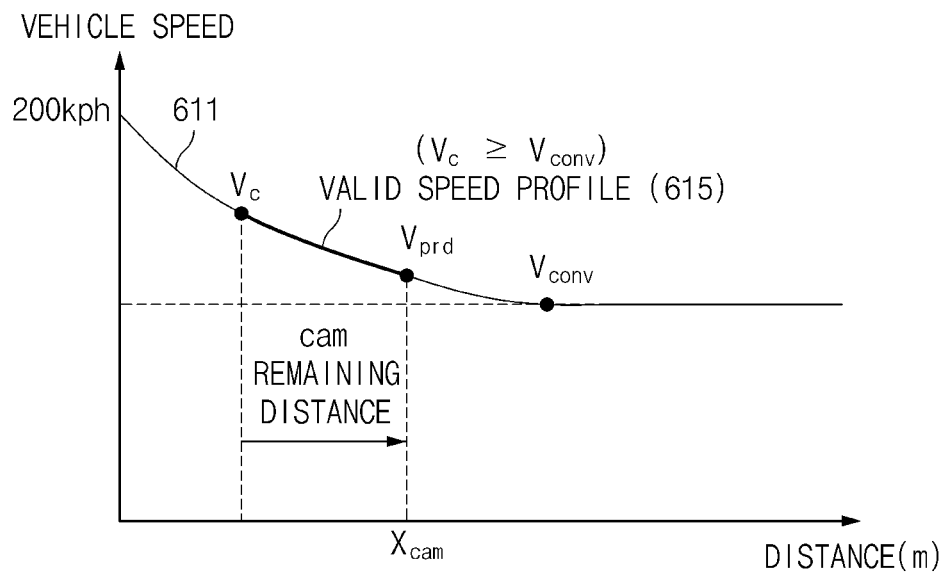
FIGS. 6A and 6B are graphs illustrating vehicle speed control based on a current speed of a vehicle and a remaining distance to a speed camera in one form of the present disclosure.
Figure 6B:
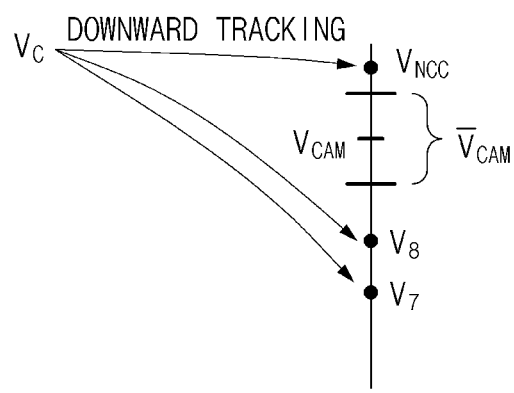

FIGS. 6A and 6B illustrate an form that predicts the speed of the vehicle when the vehicle reaches the position of the speed camera based on the high-speed type first speed profile. The high-speed type first speed profile defines a speed change according to a distance change and illustrates the speed change during the coasting driving at the high-speed state above a reference speed.

Referring to FIGS. 6A and 6B, when the current speed of the vehicle is equal to or greater than the convergence speed for each gear stage (Vc≥Vconv), the speed prediction device 160 may select the high-speed type first speed profile 611. The speed prediction device 160 may extract a valid speed profile 615, which corresponds to a remaining distance from a position corresponding to the current speed Vc to the position Xcam of the speed camera, of the selected high-speed type first speed profile 611.

The speed prediction device 160 may predict a future speed in a downward tracking manner based on the valid speed profile 615 extracted in FIG. 6A. As shown in FIG. 6B, the speed prediction device 160 may determine the predicted speed for each gear stage, e.g., VNCC, V8, V7, when the vehicle reaches the position Xcam of the speed camera based on the valid speed profile 615.

Figure 7A:
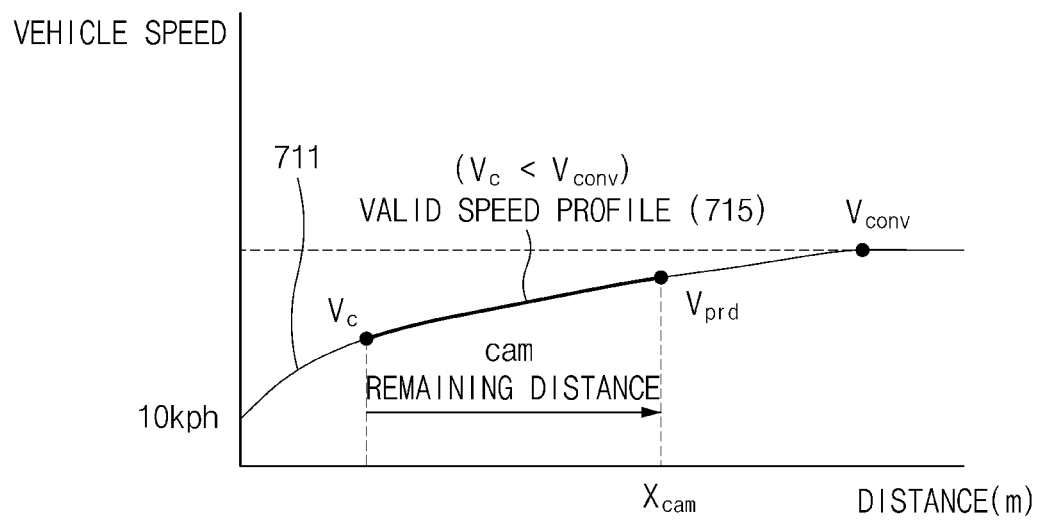
FIGS. 7A and 7B are graphs illustrating predicting vehicle speeds based on speed profiles in one form of the present disclosure.
Figure 7B:
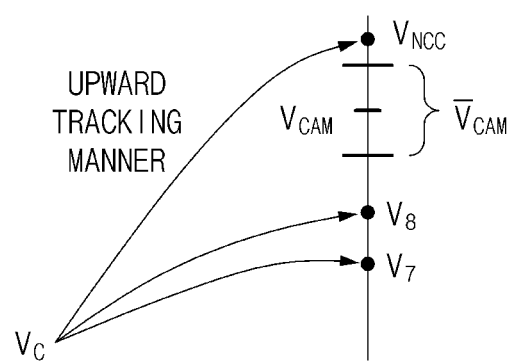

FIGS. 7A and 7B illustrate an exemplary form that predicts the speed of the vehicle when the vehicle reaches the position of the speed camera based on the low-speed type second speed profile.

Referring to FIGS. 7A and 7B, when the current speed of the vehicle is smaller than the convergence speed for each gear stage (Vc<Vconv), the speed prediction device 160 may select the low-speed type second speed profile 711. The speed prediction device 160 may extract a valid speed profile 715, which corresponds to a remaining distance from a position corresponding to the current speed Vc to the position Xcam of the speed camera, of the selected low-speed type second speed profile 711.

The speed prediction device 160 may predict a future speed in a upward tracking manner based on the valid speed profile 715 extracted in FIG. 7A. As shown in FIG. 7B, the speed prediction device 160 may determine the predicted speed for each gear stage, e.g., VNCC, V8, V7, when the vehicle reaches the position Xcam of the speed camera based on the valid speed profile 715.

FIGS. 8A to 8E are views illustrating an operation of determining a transmission gear stage of a transmission control apparatus of a vehicle according to an exemplary form of the present disclosure.

Figure 8A:
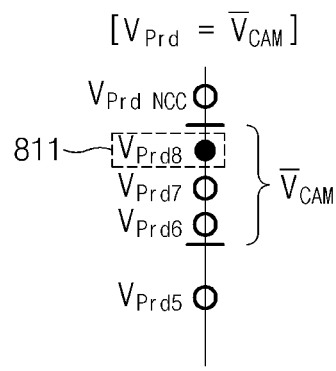
FIGS. 8A to 8E are views illustrating an operation of determining a gear stage by a transmission control apparatus of a vehicle according to an exemplary form of the present disclosure.

FIG. 8A illustrates that a speed corresponding to a speed within a speed limit range of the speed camera exists among the predicted speeds for each gear stage when the vehicle reaches the position of the speed camera.

Referring to FIG. 8A, the predicted speeds Vprd8, Vprd7, and Vprd6 for eighth, seventh, and sixth stages of the gear stage are within the speed limit range of the speed camera. In this case, the controller 110 may select the gear stage of the highest speed in the speed limit range. In other words, the controller 110 may determine the transmission gear stage to the eighth stage of the gear stage with respect to the Vprd8 811.

Figure 8B:
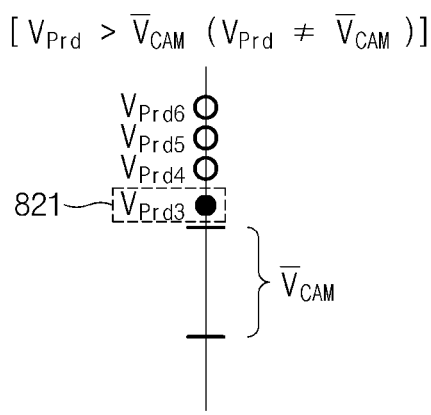

FIG. 8B illustrates that speeds predicted for each gear stage at a time point at which the vehicle reaches the position of the speed camera exceed a speed limit range of the speed camera (Vprd>Vcam).

Referring to FIG. 8B, the predicted speeds Vprd3, Vprd4, Vprd5, and Vprd6 for third, fourth, fifth, and sixth stages of the gear stage exceed the speed limit range of the speed camera. In this case, the controller 110 may select the gear stage of the speed closest to the speed limit range among the predicted speeds. In other words, the controller 110 may determine the transmission gear stage to the third stage of the gear stage with respect to the Vprd3 821.

Figure 8C:
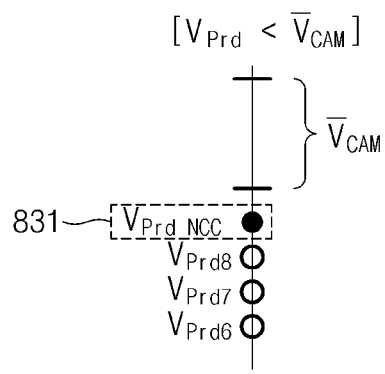

FIG. 8C illustrates that speeds predicted for each gear stage at a time point at which the vehicle reaches the position of the speed camera do not reach a speed limit range of the speed camera (Vprd<Vcam).

Referring to FIG. 8C, the predicted speeds Vprd NCC, Vprd8,Vprd7, and Vprd6 for neutral, eighth, seventh, and sixth stages of the gear stage do not reach the speed limit range of the speed camera. In this case, the controller 110 may select the gear stage of the speed closest to the speed limit range among the predicted speeds. In other words, the controller 110 may determine the transmission gear stage to the neutral stage of the gear stage with respect to the Vprd NCC 831.

Figure 8D:
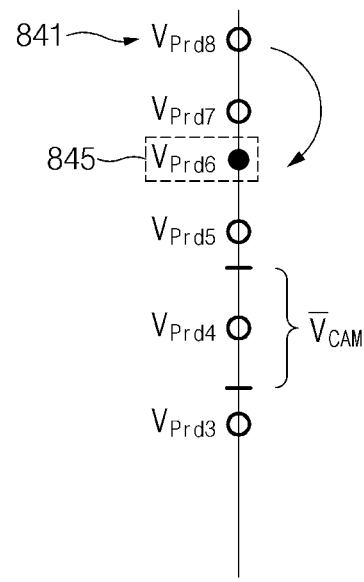

FIG. 8D illustrates that a speed corresponding to a speed within a speed limit range of the speed camera exists among the predicted speeds for each gear stage when the vehicle reaches the position of the speed camera.

Referring to FIG. 8D, when a current gear stage is the eighth stage of the gear stage, the predicted speed Vprd4 of the fourth stage of the gear stage is within the speed limit range of the speed camera. However, when the eighth stage of the gear stage is rapidly shifted to the fourth stage of the gear stage, a significant difference in control speed between the fourth and eighth stages of the gear stage occurs. Accordingly, the controller 110 may limit the maximum number of transmission gear stages.

As an example, the controller 110 may set the transmission gear stage to be shifted up to two stages above or below with respect to the current gear stage.

According to FIG. 8D, the controller 110 may determine the transmission gear stage to the sixth stage of the gear stage with respect to the Vprd6 845 closer to the speed limit range than the predicted speed Vprd8 841 of the current gear stage by two stages.

Figure 8E:
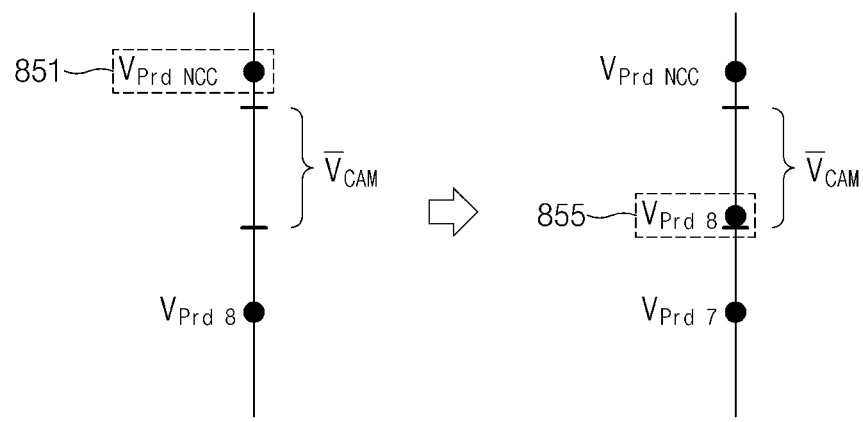

In other form, FIG. 8E illustrates that speeds predicted for each gear stage are not within a speed limit range of the speed camera (Vprd Vcam) when the vehicle reaches the position of the speed camera.

Referring to FIG. 8E, the predicted speed Vprd NCC for neutral (N) stage of the gear stage exceeds the speed limit range of the speed camera, and the predicted speed Vprd8 for the eighth stage of the gear stage do not reach the speed limit range of the speed camera.

In this case, the controller 110 may primarily determine the transmission gear stage to the N stage of the gear stage with respect to the Vprd NCC 851 closest to the speed limit range among the predicted speeds exceeding the speed limit range.

Then, the controller 110 may repeatedly calculate the predicted speed, and when the predicted speed Vprd8 of the eighth stage of the gear stage is included in the speed limit range of the speed camera before the vehicle speed reaches the shift position, the controller 110 may secondarily determine the transmission gear stage to the eighth stage of the gear stage with respect to the Vprd8 855.

The transmission control apparatus 100 operated as described above may be implemented in one independent hardware including a memory and a processer processing each operation and may be driven while being included in other hardware, e.g., a microprocessor or a general-purpose computer system.

Hereinafter, an operation of the transmission control apparatus 100 for the vehicle, which has the above-mentioned configurations, according to the present disclosure will be described in detail.

Figure 9:
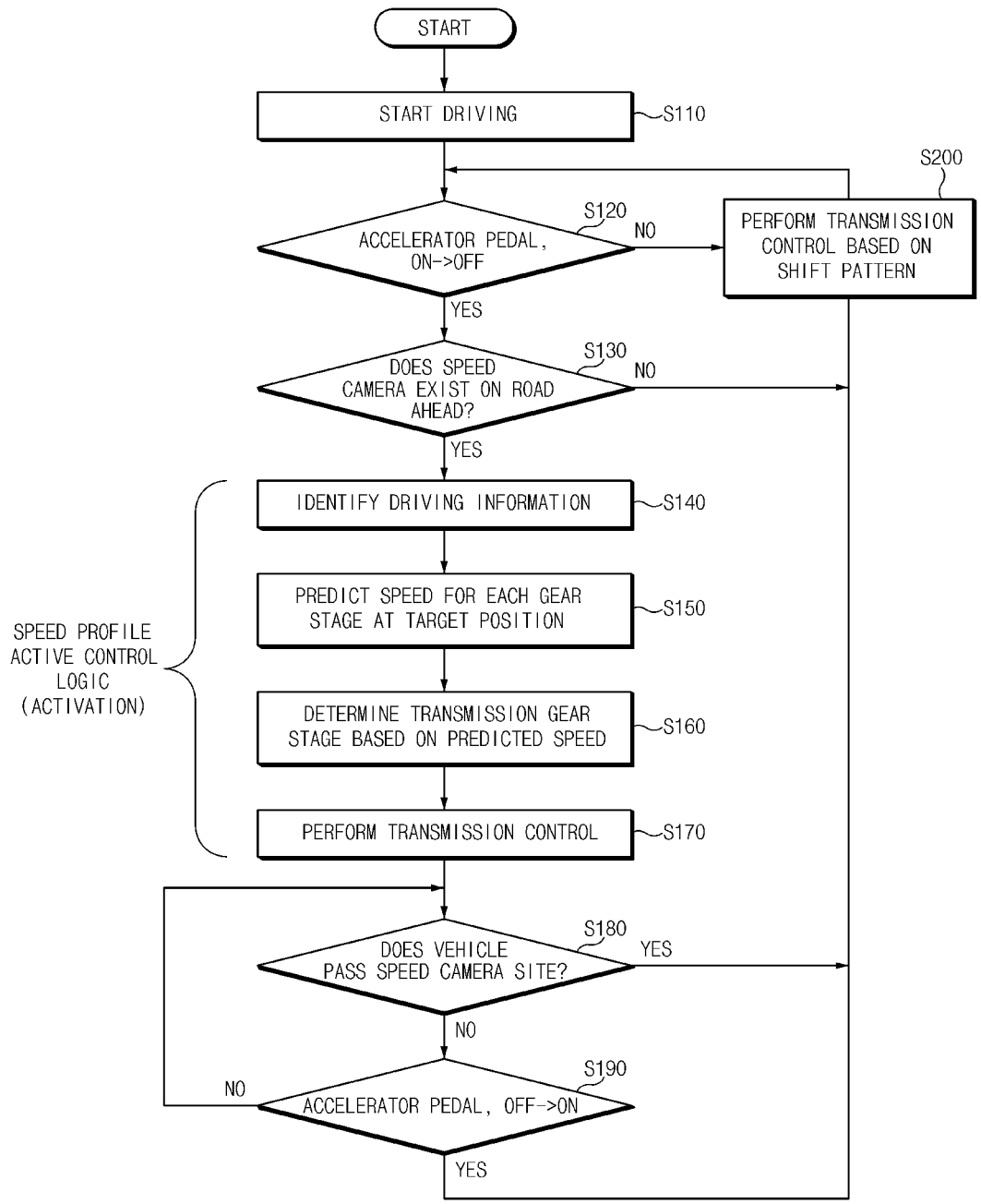
FIG. 9 is a flowchart illustrating an operation of a transmission control method of a vehicle according to an exemplary form of the present disclosure.

FIG. 9 is a flowchart illustrating an operation of a transmission control method of a vehicle according to an exemplary form of the present disclosure.

As shown in FIG. 9, the transmission control apparatus 100 identifies whether the speed camera exists on the road ahead (S130) when the vehicle starts running (S110) and the accelerator pedal is switched to the operation OFF state from the operation ON state (S120).

When the accelerator pedal is maintained in the operation ON state in operation 120 or when it is determined that the speed camera does not exist on the road ahead in operation S130 even though the accelerator pedal is switched to the operation OFF state in operation 120, the transmission control apparatus 100 performs the transmission control operation based on a predefined shift pattern (S200).

Meanwhile, when it is determined that the speed camera exists on the road ahead in operation S130, the transmission control apparatus 100 identifies the driving information on the vehicle, e.g., the current speed and the current gear stage, (S140), and predicts the speed for each gear stage at a target position, i.e., the position of the speed camera, based on the driving information identified in operation S140 (S150). The operation of predicting the speed for each gear stage at the position of the speed camera refers to forms described with reference to FIGS. 3 to 7B.

Then, the transmission control apparatus 100 may select one speed among the predicted speeds for each gear stage at the position of the speed camera and may determine the transmission gear stage based on the gear stage corresponding to the selected speed (S160). The operation of determining the transmission gear stage based on the predicted speeds for each gear stage at the position of the speed camera refers to forms described with reference to FIGS. 8A to 8E.

The transmission control apparatus 100 performs the transmission control operation based on the transmission gear stage determined in operation S160. In this case, the transmission control apparatus 100 performs the transmission control operation based on the determined transmission gear stage until the vehicle passes a speed camera site and performs the transmission control operation based on the shift pattern in accordance with operation S200 when the vehicle leaves (or passes) the speed camera site (S180).

Meanwhile, the transmission control apparatus 100 performs the transmission control operation based on the shift pattern in accordance with operation 200 when the accelerator pedal is switched to the operation ON stage from the operation OFF stage (S190) while performing the transmission control operation.

Figure 10:
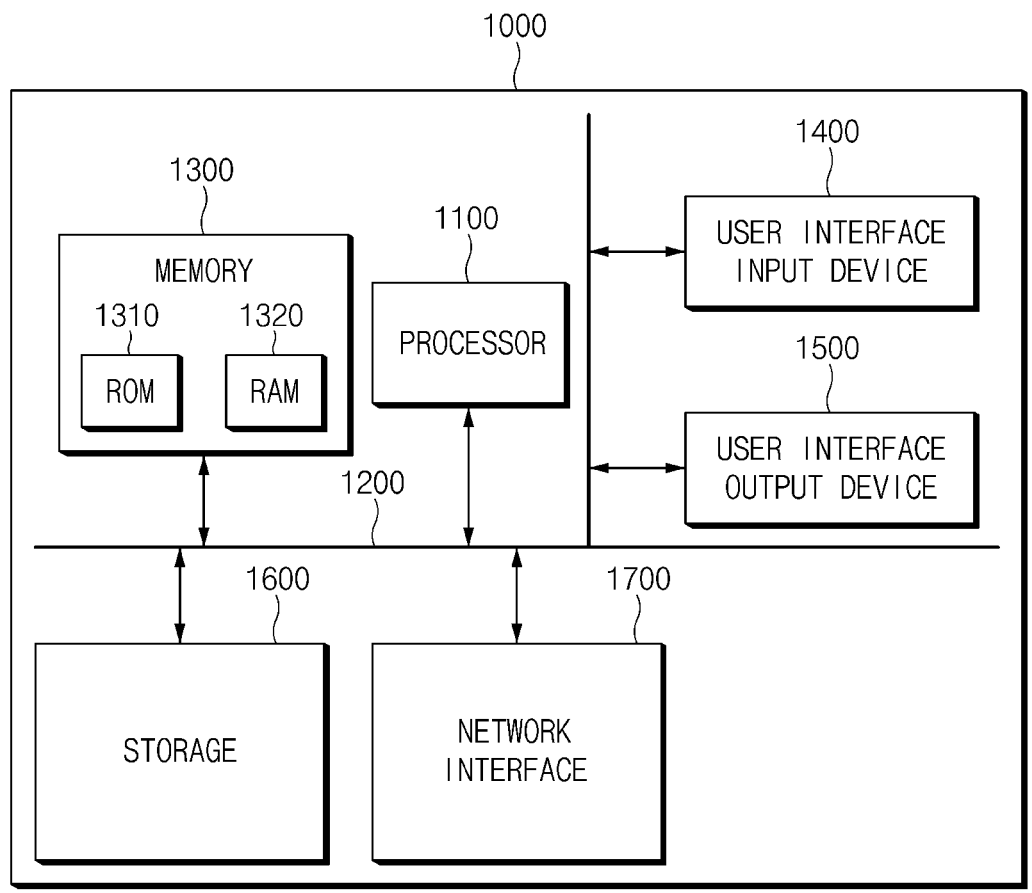
FIG. 10 is a block diagram illustrating a configuration of a computing system that executes a transmission control method of a vehicle according to an exemplary form of the present disclosure.

FIG. 10 is a block diagram illustrating a configuration of a computing system that executes a transmission control method of a vehicle according to an exemplary form of the present disclosure.

Referring to FIG. 10, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the forms disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

According to the above, the convenience of the driver may be improved by identifying information on the road ahead, such as the position of the speed camera at the front, using information of the navigation and by performing the transmission control operation by taking into account the information on the road ahead and the driving condition before the vehicle reaches a speed detection section of the speed camera.

While the present disclosure has been described with reference to exemplary forms, it will be apparent to those skilled in the art that various changes and modifications may be made without departing from the spirit and scope of the present disclosure.

Therefore, exemplary forms of the present disclosure are not limiting, but illustrative, and the spirit and scope of the present disclosure is not limited thereto. It should be interpreted that all technical ideas which are equivalent to the present disclosure are included in the spirit and scope of the present disclosure.

What is claimed is:

1. A transmission control apparatus of a vehicle, comprising:
   a speed prediction device configured to predict speeds for each gear stage from a current position of the vehicle to a position of a speed camera based on a driving state of the vehicle when it is informed that the speed camera exists on a road ahead of the vehicle while an operation of an accelerator pedal is in an OFF state; and
   a controller configured to determine a transmission gear stage based on the predicted speeds for each gear stage and to perform a transmission control operation of the vehicle based on the determined transmission gear stage.

2. The transmission control apparatus of the vehicle of claim 1, wherein the speed prediction device is configured to predict the speeds for each gear stage from the current position of the vehicle to the position of the speed camera based on a speed profile during a coasting driving based on information about the current position and a current speed of the vehicle.

3. The transmission control apparatus of the vehicle of claim 2, wherein the speed profile comprises a first speed profile that defines a speed change for each gear stage depending on a distance change during the coasting driving when a speed of the vehicle is equal to or greater than a reference speed, and a second speed profile that defines a speed change for each gear stage depending on a distance change during the coasting driving when the speed of the vehicle is smaller than the reference speed.

4. The transmission control apparatus of the vehicle of claim 3, wherein the speed prediction device is configured to:
   determine a convergence speed for each gear stage between the first speed profile and the second speed profile; and
   compare the current speed of the vehicle with the convergence speed to select one of the first speed profile and the second speed profile.

5. The transmission control apparatus of the vehicle of claim 4, wherein the speed prediction device is configured to interpolate the determined convergence speed for each gear stage based on a gradient of the road ahead of the vehicle.

6. The transmission control apparatus of the vehicle of claim 4, wherein the speed prediction device is configured to select the first speed profile when the current speed of the vehicle is equal to or greater than the convergence speed.

7. The transmission control apparatus of the vehicle of claim 4, wherein the speed prediction device is configured to select the second speed profile when the current speed of the vehicle is smaller than the convergence speed.

8. The transmission control apparatus of the vehicle of claim 4, wherein the speed prediction device is configured to extract a valid speed profile corresponding to a remaining distance from the current position of the vehicle to the position of the speed camera when one of the first speed profile and the second speed profile is selected and to predict the speeds for each gear stage to the position of the speed camera based on the extracted valid speed profile.

9. The transmission control apparatus of the vehicle of claim 1, wherein the controller is configured to:
   extract gear stages corresponding to a speed limit range of the speed camera among the predicted speeds for each gear stage; and
   determine a highest gear stage among the extracted gear stages as the transmission gear stage.

10. The transmission control apparatus of the vehicle of claim 1, wherein the controller is configured to determine a lowest speed among the predicted speeds for each gear stage as the transmission gear stage when the predicted speeds for each gear stage exceed a speed limit range of the speed camera.

11. The transmission control apparatus of the vehicle of claim 1, wherein the controller is configured to determine a highest speed among the predicted speeds for each gear stage as the transmission gear stage when the predicted speeds for each gear stage are less than a speed limit range of the speed camera.

12. The transmission control apparatus of the vehicle of claim 1, wherein the controller is configured to determine the transmission gear stage in a maximum transmission range that is previously determined based on a current gear stage of the vehicle.

13. The transmission control apparatus of the vehicle of claim 1, wherein the controller is configured to perform the transmission control operation based on a predefined shift pattern when the vehicle passes the position of the speed camera.

14. The transmission control apparatus of the vehicle of claim 1, wherein the controller is configured to perform the transmission control operation based on a predefined shift pattern when the operation of the accelerator pedal is switched to an ON state from the OFF state.

15. The transmission control apparatus of the vehicle of claim 1, further comprising an information collection device configured to collect information on the road ahead from a navigation apparatus.

16. The transmission control apparatus of the vehicle of claim 15, wherein the information on the road ahead comprise at least one of the position of the speed camera, a speed limit of the road, and a gradient of the road.

17. A transmission control method of a vehicle, comprising:
predicting, by a speed prediction device, speeds for each gear stage from a current position of the vehicle to a position of a speed camera based on a driving state of the vehicle when it is informed that the speed camera exists on a road ahead of the vehicle while an operation of an accelerator pedal is in an OFF state; and
determining, by a controller, a transmission gear stage based on the predicted speeds for each gear stage and performing a transmission control operation of the vehicle based on the determined transmission gear stage.

18. The method of claim 17, further comprising performing the transmission control operation based on a predefined shift pattern when the vehicle passes the position of the speed camera.

19. The method of claim 17, further comprising performing the transmission control operation based on a predefined shift pattern when the operation of the accelerator pedal is switched to an ON state from the OFF state.

20. The method of claim 17, further comprising collecting at least one of the position of the speed camera, a speed limit of the road, or a gradient of the road from a navigation apparatus.

21. A vehicle system comprising:
a navigation apparatus; and
a transmission control apparatus configured to:
determine a transmission gear stage based on predicted speeds for each gear stage from a current position of a vehicle to a position of a speed camera based on a driving state of the vehicle when the navigation apparatus identifies a presence of the speed camera on a road ahead of the vehicle; and
perform a transmission control operation of the vehicle based on the determined transmission gear stage.

* * * * *